(12) United States Patent
Del Fabro

(10) Patent No.: US 10,376,948 B2
(45) Date of Patent: Aug. 13, 2019

(54) APPARATUS AND METHOD FOR FEEDING BARS

(71) Applicant: M.E.P. Macchine Elettroniche Piegatrici S.p.A., Reana del Rojale (IT)

(72) Inventor: Giorgio Del Fabro, Udine (IT)

(73) Assignee: M.E.P. Macchine Elettroniche Piegatrici S.p.A., Reana del Rojale (IT)

( * ) Notice: Subject to any disclaimer, the term of this patent is extended or adjusted under 35 U.S.C. 154(b) by 0 days.

(21) Appl. No.: 15/552,222

(22) PCT Filed: Feb. 18, 2016

(86) PCT No.: PCT/IB2016/050875
§ 371 (c)(1),
(2) Date: Aug. 18, 2017

(87) PCT Pub. No.: WO2016/132513
PCT Pub. Date: Aug. 25, 2016

(65) Prior Publication Data
US 2018/0036787 A1     Feb. 8, 2018

(30) Foreign Application Priority Data

Feb. 18, 2015 (IT) .............................. UD2015A0017

(51) Int. Cl.
*B23Q 7/02* (2006.01)
*B65G 37/02* (2006.01)
(Continued)

(52) U.S. Cl.
CPC .......... *B21F 23/005* (2013.01); *B21D 43/006* (2013.01); *B65G 47/92* (2013.01); *B23Q 7/02* (2013.01); *B65G 47/1485* (2013.01)

(58) Field of Classification Search
CPC .. B21D 43/006; B65G 47/92; B65G 47/1485; B21F 23/005; B23Q 7/02
See application file for complete search history.

(56) References Cited

U.S. PATENT DOCUMENTS 2,597,900 A * 5/1952 Paynter ................ B65G 47/846
                                                                    198/608
2,946,583 A * 7/1960 Conner .................... B23Q 7/02
                                                                    269/228
(Continued)

FOREIGN PATENT DOCUMENTS

DE       41 11 062 C1      5/1992
DE       4035345 A1 *      5/1992  ........... B21B 39/002
(Continued)

OTHER PUBLICATIONS

International Search Report and Written Opinion from corresponding International Application No. PCT/IB2016/050875 dated May 19, 2016; (9 pp).

*Primary Examiner* — Gregory W Adams
(74) *Attorney, Agent, or Firm* — Calderone Bullock LLC

(57) ABSTRACT

An apparatus to feed bars is disclosed that comprises a feed device suitable to support a plurality of bars and to make them available to a transfer device. The transfer device is configured to transfer the bars, received from the feed device, toward a delivery zone, and comprises at least one gripping and holding element, configured to take at least one bar from the feed device and to transfer it, by means of rotation around an axis of rotation, toward the delivery zone. The axis of rotation is located, during use, substantially parallel to the longitudinal development of the bars.

11 Claims, 2 Drawing Sheets

(51) Int. Cl.
*B65G 47/84* (2006.01)
*B21F 23/00* (2006.01)
*B21D 43/00* (2006.01)
*B65G 47/92* (2006.01)
*B65G 47/14* (2006.01)

(56) References Cited

U.S. PATENT DOCUMENTS

| | | | | | |
|---|---|---|---|---|---|
| 2,993,606 | A | * | 7/1961 | Helstrom | B65G 47/1492 198/443 |
| 3,024,922 | A | * | 3/1962 | Clark | B21D 43/006 198/562 |
| 3,214,001 | A | * | 10/1965 | Callaghan | B21B 39/002 198/427 |
| 3,360,164 | A | * | 12/1967 | Zerlaut | B21D 43/006 221/239 |
| 3,596,551 | A | | 8/1971 | Lyamets | |
| 3,724,648 | A | * | 4/1973 | Schaller | B65G 47/295 198/443 |
| 3,780,848 | A | * | 12/1973 | Studeny | B65G 47/846 198/463.6 |
| 4,075,086 | A | * | 2/1978 | Marsh, III | B07C 5/122 198/473.1 |
| 4,388,989 | A | * | 6/1983 | Edmunds | B23Q 7/02 198/346.2 |
| 4,790,061 | A | * | 12/1988 | Walker | B23Q 7/02 198/339.1 |
| 7,219,521 | B1 | * | 5/2007 | Eldredge | B21B 43/003 198/450 |

FOREIGN PATENT DOCUMENTS

| | | | | |
|---|---|---|---|---|
| EP | 1 428 594 | A2 | 6/2004 | |
| EP | 1428594 | A2 * | 6/2004 | ........... B21B 39/002 |
| GB | 1454094 | A * | 10/1976 | ........... B65G 47/92 |
| WO | WO 03/072276 | | 9/2003 | |

* cited by examiner

APPARATUS AND METHOD FOR FEEDING BARS

BACKGROUND OF THE INVENTION

Field of the Invention

The present invention concerns an apparatus to feed bars such as round pieces, wire, ribbed profiles, for example of the type used for making reinforcements for the building trade.

In particular, it concerns an apparatus configured to feed bars individually or more than one, toward an operating machine which, merely by way of example, can be a welding machine for metal meshes.

The present invention also concerns a method to feed bars.

Description of Related Art

The use of apparatuses to feed bars is known, for example to feed a welding machine for the production of electro-welded meshes.

Known welding machines generally comprise an array of welding devices disposed aligned with each other in a direction transverse to the direction of feed of the electro-welded meshes and each configured to weld at least two bars disposed transversely one with respect to the other, i.e. at least one longitudinal bar and one transverse bar.

Known welding machines comprise a plurality of first apparatuses to feed longitudinal bars. Each of the first feed apparatuses is configured to feed the longitudinal bars substantially continuously, in a direction substantially parallel to the direction of feed of the electro-welded mesh. Each feed apparatus is located substantially aligned with one of the welding devices.

Known welding machines also comprise a second feed apparatus, in some cases also more than one, configured to feed the transverse bars and to dispose them above or below the longitudinal bars.

In one known solution, the second feed apparatus is typically the type configured to feed a transverse bar in a direction transverse to the direction of feed of the longitudinal bars, so as to determine an intersection of the transverse bar with respect to the longitudinal bars.

The second feed apparatus is generally configured to remove the bar from a coil, straighten it with possible straightening devices and make it available to the welding machine, disposing it above the longitudinal bars. Once the transverse bar has been fed by the desired length, it is cut to size with suitable cutting devices, for example shears.

This configuration of the second feed apparatus determines a considerable overall bulk of the welding machine, at least in a direction substantially transverse to the direction of feed of the metal mesh.

Furthermore, a configuration of the second feed unit of this type determines great structural and management complexity of the welding machine, caused in particular by the high number of operating components present.

A solution is also known in which the second feed apparatus is configured to feed transverse bars already linearized and cut to size.

In this case too, it is provided to feed the transverse bars laterally with respect to the longitudinal bars, and in a direction transverse to the latter, in order to position them above.

Although it reduces the number of operating components required, this solution too is particularly bulky since it has to be installed laterally to the first feed apparatus.

Furthermore, in this solution, it is particularly complex to separate the transverse bars which are usually made available in bundles of bars and are supplied to the second feed apparatus.

In fact, one of the disadvantages that often occurs in this type of feed apparatuses is that the second feed apparatus cannot pick up any transverse bar, or it supplies the welding machine with several transverse bars simultaneously, or in other cases blockages of the transverse bars occur.

Moreover, this device is not able to ensure a correct and precise positioning of the transverse bars with respect to the longitudinal bars, in this case causing electro-welded meshes of poor quality.

Second feed apparatuses are also known consisting of mobile articulated arms, provided with a gripping element, generally of the magnetic type, or the clamp type, configured to take one or more bars from a bundle of bars and to transfer them, in a desired position, in the welding machine.

However, this solution too is particularly complex to obtain and manage, and it does not guarantee a correct and precise feed of the transverse bars.

Moreover, the gripping elements act on the bar for a longitudinal portion with a rather limited extension, usually in a zone comprised in the center line of the bar, leaving the opposite segments of the bar suspended cantilevered. In this condition, particularly for long, thin bars, the ends of the bars tend to bend downward due to their own weight and, due to the inertia movement to which they are subjected, can oscillate uncontrollably with respect to the gripping point.

These oscillations can cause the transverse bars to knock against operating parts of the welding machine or the second feed apparatus itself, and also, in some cases, they can cause blockages to the machine if the bar gets stuck in the operating parts.

Other apparatuses to feed bars are described for example in documents WO-A-03/072276, U.S. Pat. No. 3,596,551, DE-C-41.11.062, and EP-A-1.428.594.

Such transfer apparatuses, however, are not able to control the movement of the bars from the zone where they are picked up to the delivery zone. This can cause the above disadvantages of sticking and blockage of the machine, and also possible knocking of the bar against parts of the machine itself.

BRIEF SUMMARY OF THE INVENTION

One purpose of the present invention is to supply an apparatus to feed bars that is simple to make and to manage.

Another purpose of the present invention is to obtain an apparatus to feed bars that is efficient and prevents the generation of blockages both in the feed apparatus itself and also to an operating machine disposed downstream.

Another purpose of the present invention is to obtain an apparatus to feed bars that allows to feed the bars precisely and reliably to an operating machine disposed downstream.

The Applicant has devised, tested and embodied the present invention to overcome the shortcomings of the state of the art and to obtain these and other purposes and advantages.

The present invention is set forth and characterized in the independent claims, while the dependent claims describe other characteristics of the invention or variants to the main inventive idea.

In accordance with the above purposes, an apparatus to feed bars comprises a feed device suitable to feed a plurality of bars to a transfer device. The transfer device is configured to transfer the bars, received from the feed device, toward a delivery zone.

According to one aspect of the present invention, the transfer device comprises a transfer disc on which at least one gripping and holding element is installed, provided with at least one housing seating.

The gripping and holding element is configured to take at least one bar from the feed device, to hold it in the housing seating and to transfer it, by means of rotation around an axis of rotation, toward the delivery zone. Moreover, according to another aspect, the axis of rotation is located, during use, substantially parallel to the longitudinal development of the bars.

The apparatus according to the present invention also comprises at least a support member with a substantially discoidal shape, selectively rotatable around the axis of rotation, disposed distanced, along the axis of rotation with respect to the transfer device, and provided with at least one support seating disposed in an angular position substantially mating with that of the housing seating of the gripping and holding element to support each bar during the transfer.

This configuration allows to contain the overall bulk of the feed apparatus and also of the operating machines that cooperate with it.

Moreover, this feed apparatus is particularly simple to make and easy to manage.

With the present invention, it is also possible to transfer the bars present in the feed device, keeping them substantially parallel to the axis of rotation and in this way ensuring a precise positioning of the bars in the delivery zone. In fact, the feed apparatus prevents the bars from moving parallel to their longitudinal extension.

Furthermore, the presence of the support members allows to accompany the bar during its rotation, preventing it from getting stuck in parts of the machine, and causing blockages or malfunctions.

The combination of the transfer device and the support member allows on the one hand to ensure the transfer of the bars, and on the other hand to support the bars during movement, so that they can be delivered to the delivery zone in a predefined and precise position.

The present invention also concerns a method to feed bars that provides to:
feed a plurality of bars to a feed device;
deliver the bars to a transfer device, and
transfer the bars toward a delivery zone by means of the transfer device.

According to a possible formulation of the present invention, the transfer of the bars is carried out by making at least one gripping and holding element of the transfer device rotate around an axis of rotation, located during use substantially parallel to the longitudinal development of the bars. The gripping and holding element is provided with a housing seating into which at least one of the bars is inserted and held during its rotation.

Moreover, during the transfer of the bar, at least one support member, with a substantially discoidal shape, rotates around the axis of rotation and supports the bar in a support seating disposed in an angular position substantially mating with that of the housing seating of the gripping and holding element.

BRIEF DESCRIPTION OF THE SEVERAL VIEWS OF THE DRAWINGS

These and other characteristics of the present invention will become apparent from the following description of some embodiments, given as a non-restrictive example with reference to the attached drawings wherein.

DETAILED DESCRIPTION OF THE INVENTION

Figure 1:
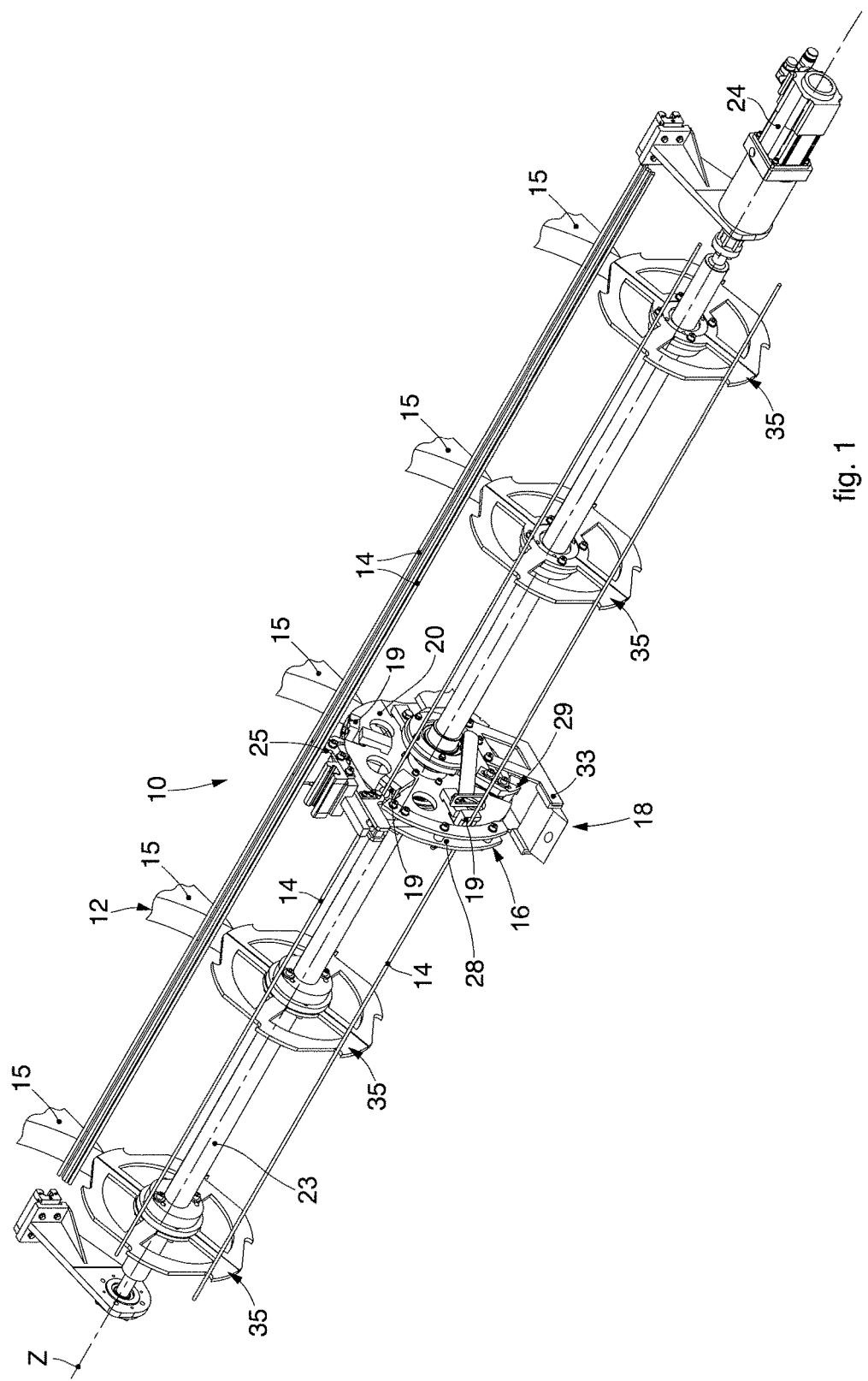
FIG. 1 is a perspective view of an apparatus to feed bars according to the present invention.

To facilitate comprehension, the same reference numbers have been used, where possible, to identify identical common elements in the drawings. It is understood that elements and characteristics of one embodiment can conveniently be incorporated into other embodiments without further clarifications.

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

According to the present description, FIG. 1 shows a feed apparatus 10 for bars 14, which can be used to feed the bars 14 to an operating machine disposed downstream, for example a welding machine.

The feed apparatus 10 comprises a feed device 12 suitable to temporarily support a plurality of bars 14 and to make them available to a transfer device 16 disposed downstream thereof.

The feed device 12 can be governed by supply means, not shown in the drawings, to supply a plurality of bars 14, which can comprise gripping and transfer members suitable to remove a group of bars, for example from a bundle.

According to a variant, it can be provided that a bundle of bars 14 is positioned directly in the feed device 12.

The transfer device 16, in its turn, is configured to transfer the bars 14 received from the feed device 12 toward a delivery zone 18.

The delivery zone 18 can correspond with a zone, for example inside the operating machine, where the bar 14 is for example welded to another bar, or it can correspond to a temporary housing zone of the bar 14, to allow it to be subsequently transferred, for example to the operating machine, as will be described hereafter.

According to possible solutions, the feed device 12 can comprise a support plane, a device conformed as a cradle, or one or more support brackets 15 disposed reciprocally distanced to support the bars 14 in different zones.

Figure 2:
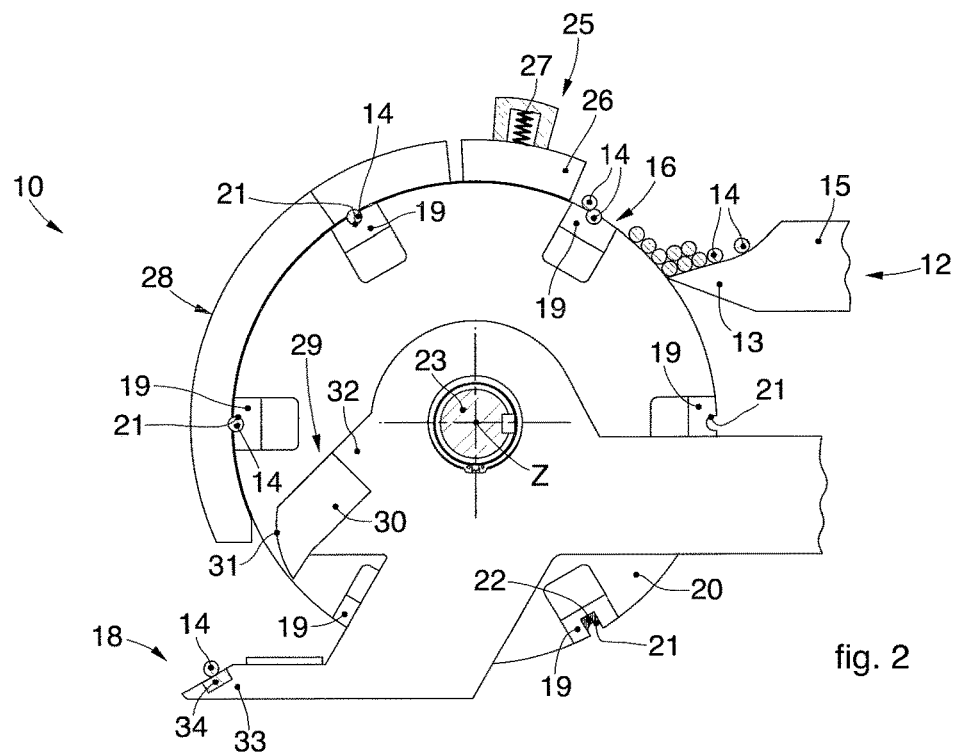
FIG. 2 is a lateral view of an enlarged detail of FIG. 1.

In FIGS. 1 and 2 the feed device 12 comprises a plurality of support brackets 15.

According to one possible solution, the feed device 12 can be provided with one or more introduction portions 13 (FIG. 2) configured to convey the bars 14 to the transfer device 16.

The introduction portions 13 can comprise, for example, an inclined plane, or a segment of support bracket 15 that is inclined toward the transfer device 16. According to one possible solution, the introduction portions 13 can be inclined downward so as to exploit the action of gravity, to make the bars 14 available to the transfer device 16.

According to a possible solution of the present invention, the transfer device 16 comprises at least a gripping and holding element 19 configured to take from the feed device 12 at least one bar 14 and transfer it, by rotating it around an axis of rotation Z, to the delivery zone 18. Moreover, the axis of rotation Z is located during use substantially parallel to the longitudinal development of the bar 14.

This configuration allows to simplify the operations to feed the bars to an operating machine and allow to obtain repeatedly precise positionings of the bars in the delivery zone 18. In fact, during the transfer of the bar 14 removed, it is always kept substantially parallel to the axis of rotation Z, preventing any movement in the longitudinal direction.

According to possible solutions of the present invention, shown for example in FIGS. 1 and 2, the transfer device 16 comprises a plurality of gripping and holding elements 19.

According to a possible embodiment of the present invention, the gripping and holding elements 19 can be disposed angularly distanced from each other with respect to the axis of rotation Z.

According to another embodiment of the invention, the gripping and holding elements 19 can be angularly distanced by a uniform pitch, for example disposed every 180°, 120°, 90°, 60°, 45°, 30° or according to different angles.

According to a possible solution, the gripping and holding element 19 can comprise a magnet, either permanent or an electromagnet, a gripper, a housing seating, or a possible combination of the above.

According to the embodiment shown in FIG. 2, the gripping and holding element 19 is provided, on its surface facing toward the outside, with a housing seating 21 suitable to at least partly house a bar 14. According to a possible variant, not shown in the drawings, the gripping and holding element 19 can be provided with two or more housing seatings 21, disposed distanced from each other and suitable to each house a bar 14.

Another variant of the present invention for particular application requirements, can provide that the housing seating 21 is configured to house two or more bars 14.

According to another embodiment of the invention (FIG. 2), the gripping and holding element 19 can comprise a magnetic element 22, suitable to hold the bar 14 made of metal material by magnetic action, also during its rotation around the axis of rotation Z.

According to a possible solution, the magnetic element 22 can define the housing seating 21.

According to a possible variant, the magnetic element 22 can be associated with or incorporated in the gripping and holding element 19, possibly in correspondence with the housing seating 21 if present.

According to a possible solution, the gripping and holding elements 19 are associated with at least one actuation member 24, configured to make the gripping and holding elements 19 rotate around the axis of rotation Z.

According to a possible embodiment (FIGS. 1 and 2), the transfer device 16 comprises at least a transfer disc 20, substantially circular in shape and on the periphery of which the at least one gripping and holding element 19 is installed.

According to possible solutions, if a plurality of gripping and holding elements 19 are provided, they are installed on the transfer disc 20 all at the same radial distance from the axis of rotation Z. This facilitates the action of gripping and holding the bars by each gripping and holding element 19.

According to other embodiments, the gripping and holding elements 19, together with the transfer disc 20, define a substantially circular and uniform external surface. This condition prevents, during the rotation of the transfer disc 20, any blockages of the bars 14 occurring.

According to a possible variant, not shown in the drawings, the transfer device 16 can comprise a plurality of transfer discs 20 located distanced from each other along the axis of rotation Z and the gripping and holding elements 19 can be installed on each of them. Each gripping and holding element 19 in this case can be distanced angularly both with respect to gripping and holding elements 19 installed on its transfer disc 20 and also with respect to gripping and holding elements 19 installed on different transfer discs 20.

According to the embodiment in FIGS. 1 and 2, the transfer disc 20 is keyed on a rotation shaft 23 located coaxial with the axis of rotation Z.

The rotation shaft 23 is in turn connected to the actuation member 24, to make the rotation shaft 23 rotate around the axis of rotation Z.

According to a possible embodiment of the present invention, a selector device 25 is associated with the transfer device 16, and is configured to ensure that each gripping and holding element 19 transfers a predefined number of bars 14, usually one, to the delivery zone 18.

According to a possible solution, and if the gripping and holding element 19 is provided with a housing seating 21, the selector device 25 can be configured to ensure that a predefined number of bars 14, usually one, is positioned in the housing seating 21.

According to the embodiment in which the gripping and holding element 19 comprises a magnetic element 22, the selector device 25 ensures that the gripping and holding element 19 does not hold more bars 14 than those provided.

According to the embodiment shown in FIG. 2, the selector device 25 is associated in a fixed position and tangentially on the periphery of the transfer disc 20, and allows to transfer only the bars 14 that are attracted by the magnetic element 22 and are positioned inside the housing seating 21.

According to a possible solution, the selector device 25 can comprise a presser element 26, positioned on the periphery of the transfer disc 20 and kept under pressure against the latter by means of one or more elastic elements 27.

The elastic elements 27 allow the presser element 26 to adapt to possible irregularities of the bar 14 that is positioned in cooperation with the housing seating 21, but does not allow the bars 14 positioned on the gripping and holding element 19, outside the housing seating 21 and for example held by the magnetic action of the magnetic element 22, to be transferred to the delivery zone 18.

According to a possible solution of the present invention, a containing body 28 can be associated with the transfer device 16 and is configured to contain the movements of the bar 14 during its transfer, and to ensure it is held by the gripping and holding element 19.

According to a possible solution, the containing body 28 can be associated on the periphery of the transfer disc 20, to partly surround it, at least for part of the angular sector comprised between the feed device 12 and the delivery zone 18.

In particular, the containing body 28 allows to close the housing seating 21, at least for said angular sector, and hence to hold inside it the bar 14 that is transferred.

The containing body 28 can also perform the function of holding the bars 14 if the gripping and holding elements 19 are provided for example with the housing seating 21 alone. In this case, the containing body 28 itself ensures that the bar 14 is maintained in position.

According to a possible embodiment, the transfer device 16 can also comprise at least one expulsion device 29, configured to expel from the at least one gripping and holding element 19 the at least one bar 14 held, and to deliver it to the delivery zone 18.

According to a possible embodiment (FIG. 2), the expulsion device 29 comprises a shaped element 30 installed in a fixed position with respect to the transfer disc 20 and located adjacent to it. The shaped element 30 is also provided with an abutment surface 31 having at least one portion located at a distance with respect to the axis of rotation Z at least equal to the distance between the gripping and holding element 19 and the axis of rotation Z itself. In this way, when the gripping and holding element 19 is positioned during rotation in correspondence with the shaped element 30, it takes the bar 14 to a condition of interference with the abutment surface 31, which determines its release by the gripping and holding element 19.

The shaped element 30 exerts a radial thrust on the bar 14, with respect to the axis of rotation Z, to possibly make it exit from the housing seating 21 and/or to release it from the magnetic holding action of the magnetic element 22.

According to a possible solution, the expulsion device 29 is installed on a support bracket 32 located in a fixed position with respect to the axis of rotation Z.

As shown in FIGS. 1 and 2, the expulsion device 29 is installed in a fixed position and adjacent to the transfer disc 20.

The expulsion device 29 can be positioned immediately downstream of the containing body 28, if present, and in direct proximity to the delivery zone 18.

According to the embodiment in FIG. 2, the delivery zone 18 corresponds to a temporary delivery zone of the bars 14.

The delivery zone 18 can comprise a support plane, a shaped element or suchlike, configured to house the bar 14 expelled from the transfer device 16.

According to the embodiment shown in FIGS. 1 and 2, the delivery zone 18 comprises a support element 33, located in a fixed position with respect to, and suitable to support, the bar 14, once delivered by the transfer device 16.

According to a possible solution the support element 33 is installed on a support bracket fixed with respect to the axis of rotation Z, and which in this case corresponds with the support bracket 32 of the expulsion device 29.

The support element 33 comprises a positioning element 34, suitable to hold the bar 14 on the support element 33, preventing it from slipping and thus keeping it in the desired position, ready to be delivered to the operating machine downstream.

According to some embodiments, the positioning element 34 can comprise a magnet, which holds the bar 14 through magnetic attraction.

According to a variant, the positioning element 34 can comprise a gripper, a bracket or other suitable element to keep a bar 14 in a determinate position.

In this way the bar 14 is stably held by the positioning element 34.

According to some embodiments, the apparatus to feed bars can comprise at least a support member 35 disposed distanced, along the axis of rotation Z, with respect to the transfer device 16 and configured to support the bars 14 during their transfer from the feed device 12 to the delivery zone 18.

The apparatus 10 to feed bars according to the present invention can comprise a plurality of support members 35, depending on the length of the apparatus 10 to feed bars, or depending on the length of the bars 14.

In the apparatus 10 to feed bars shown in FIG. 1, four support members 35 are shown by way of example, but the number can vary according to needs.

According to a possible embodiment of the present invention, the support members 35 can be installed on the rotation shaft 23 and are disposed distanced along the longitudinal extension thereof.

According to a possible solution, the transfer device 16 is installed in an intermediate position on the length of the rotation shaft 23 and the support members 35 are installed laterally to the transfer device 16. This ensures a greater control of the movement of the bar 14 during its rotation around the axis of rotation Z.

The support members 35 can be made to rotate around the axis Z in a coordinated manner, for example synchronized with the gripping and holding elements 19.

According to a possible embodiment (FIGS. 1 and 3), the support members 35 can be keyed onto the rotation shaft 23, and can therefore rotate solid therewith.

The support members 35 can be selectively translatable, for example manually by an operator, during the setting or start-up steps of the machine, along the rotation shaft 23, to be positioned on each occasion at the most suitable distance one with respect to the other, and with respect to the transfer device 16, also in relation to the length and sizes of the bar 14 that is being processed.

Figure 3:
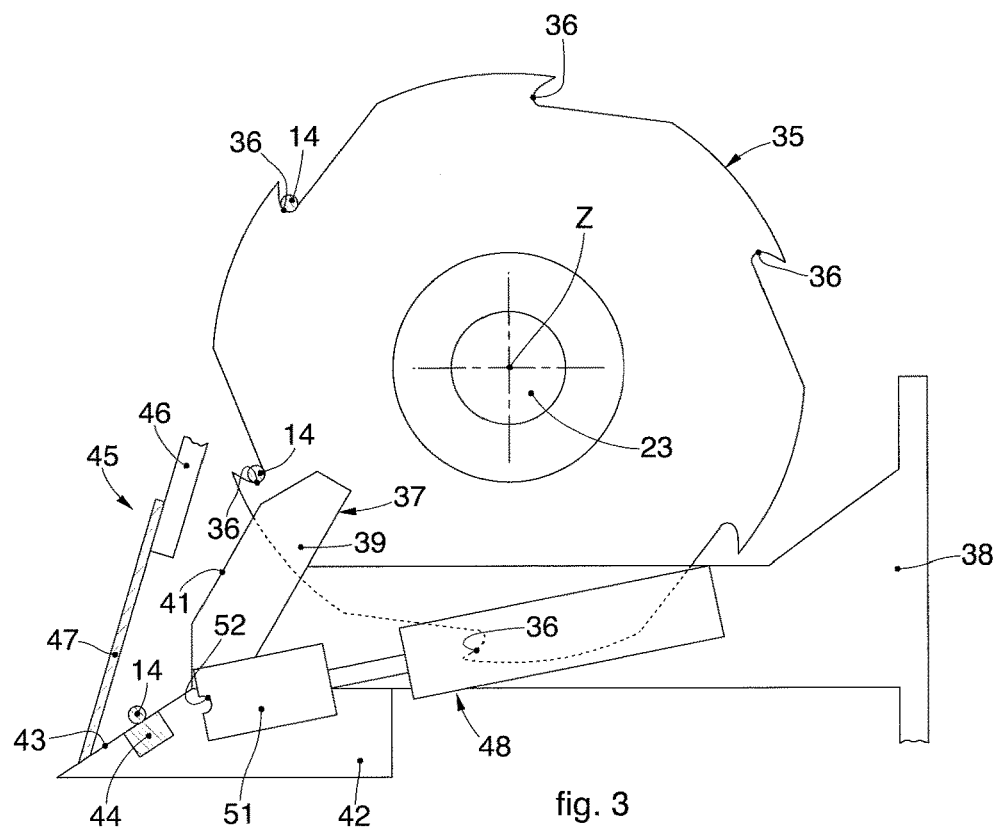
FIG. 3 is a lateral view of another enlarged detail of FIG. 1.

According to the embodiment shown in FIG. 3, the support members 35 have a substantially discoidal shape and are provided, on the perimeter surface, with at least one support seating 36, in this case a plurality of support seatings 36 suitable to house and support said at least one bar 14.

According to one solution, the support seatings 36 are equal in number and are disposed according to an angular configuration substantially mating with that of the housing seatings 21 of the gripping and holding elements 19.

In particular, it can be provided that the support seatings 36 of the support members 35 are located according to a pattern substantially analogous to that of the housing seatings 21 of the gripping and holding elements 19.

In this way, when the gripping and holding element 19 houses a bar 14 in the housing seating 21, the cantilevered portions of the bar 14 are supported by the support seatings 36.

According to some embodiments, the support seatings 36 are perfectly aligned, for example parallel to the axis of rotation Z, with the gripping and holding elements 19.

According to a variant, the support seatings 36 are positioned slightly misaligned, or angularly offset, with respect to the gripping and holding elements 19, so that the ends of the bars 14 are supported slightly upward with respect to the gripping point of the gripping and holding element 19.

Advantageously, this prevents the ends of the bars 14 from bending downward due to the force of gravity, thus interfering with the delivery zone 18 or with other operating components.

The support members 35 allow to increase the transfer speed of rotation of the gripping and holding elements 19 and hence to increase the speed of feed of the bars 14. The support members 35 prevent the ends of the bars 14 from oscillating, and hence interfering with other bars 14 or with operating components.

According to some embodiments of the present invention, the support members 35 cooperate with expulsion devices 37, positioned fixed laterally to the support members 35.

According to a solution shown in FIG. 3, the expulsion device 37 is configured to expel from the at least one support seating 36 the at least one bar 14 held, and to deliver it to the delivery zone 18.

According to possible solutions, the expulsion devices 37 are installed on a support frame 38, in a fixed position with respect to the axis of rotation Z and in proximity to the delivery zone 18.

According to a possible embodiment (FIG. 3), the expulsion device 37 comprises a shaped element 39 provided with an abutment surface 41 having at least one portion located at a distance with respect to the axis of rotation Z at least equal to, preferably greater than, the distance between the support seating 36 and the axis of rotation Z. In this way, when the support seating 36, during rotation, is positioned in correspondence with the shaped element 39, it takes the bar 14 to a condition of interference with the abutment surface 41, which determines its release from the support seating 36.

The shaped element 39 exerts a radial thrust on the bar 14, with respect to the axis of rotation Z, to make it exit from the support seating 36.

According to a variant, an expulsion device 37 is provided, disposed every two support members 35, positioned in the space comprised between two support members 35 adjacent to each other.

The delivery zone 18 can comprise a bracket 42, in correspondence with every expulsion device 37, suitable to receive the bars 14.

The bracket 42 can be connected by any known mean to the support frame 38. According to a possible solution, the bracket 42 can be defined by or have the function of said support element 33 described above.

According to some embodiments, the bracket 42 can have an inclined surface 43, along which the bars 14 can slide and run.

According to some embodiments, the bracket 42 comprises a positioning element 44, suitable to hold the bar 14 and prevent it from sliding, thus keeping it in the desired position, ready to be fed, for example, to the operating machine downstream.

According to the solution shown in FIG. 3, the positioning element 44 can be a magnet, able to attract the bar 14.

According to a variant, the positioning element 44 can be a gripper, a bracket or any other element suitable to keep a bar 14 in a determinate position.

The bracket 42 can cooperate with a safety element 45, configured to hold the bars 14 further if they are not directly gripped on the positioning elements 44.

The safety element 45 can be supported by a bracket 46, which can also be connected in a known manner to the support frame 38.

The safety element 45 can comprise a foil 47, made of an elastically deformable material, for example harmonic steel, which in the inactive position, not subjected to tension, is positioned in contact with the bracket 42.

The foil 47 can rise upward, if subjected to pressure, distancing itself from the bracket 42 and allowing the bars 14 to pass, when they have to be transferred from the delivery zone 18 to the operating machine downstream.

According to some embodiments, the feed apparatus 10 comprises at least a movement member 48 configured to transfer the bars 14 from the delivery zone 18 to the operating machine located downstream.

According to possible solutions, the movement member 48 can be chosen from a group comprising a linear actuator, an articulated mechanism, a rod and crank device or possible combinations thereof.

The movement member 48 is configured to thrust the bar 14 from the delivery zone 18 to the operating machine.

According to a possible variant, the movement member 48 can be configured to pick up the bars 14, for example by clamping them.

The movement member 48 can be provided with a thrust element 51 having a cavity 52, conformed so as to house a bar 14 and exert the thrust action.

The movement member 48 can be positioned in correspondence with the transfer device 16 and/or in correspondence with the support members 35, or in their intermediate positions along the axis of rotation Z.

It is clear that modifications and/or additions of parts may be made to the apparatus 10 to feed bars as described heretofore, without departing from the field and scope of the present invention.

It is also clear that, although the present invention has been described with reference to some specific examples, a person of skill in the art shall certainly be able to achieve many other equivalent forms of apparatus 10 to feed bars 14, having the characteristics as set forth in the claims and hence all coming within the field of protection defined thereby.

I claim:

1. An apparatus to feed bars comprising a feed device suitable to feed a plurality of bars to a transfer device, said transfer device being configured to transfer said bars toward a delivery zone, wherein said delivery zone comprises at least a support element configured to receive said bar and a positioning element suitable to hold said bar in position, said positioning element comprising a magnet for holding said bar, and said transfer device comprising a transfer disc on which at least one gripping and holding element is installed, provided with a housing seating, said gripping and holding element being configured to take at least one bar from said feed device in order to hold said bar in said housing seating and to transfer said bar by means of rotation around an axis of rotation, toward said delivery zone, and the apparatus further comprising at least a support member with a substantially discoidal shape, selectively rotatable around said axis of rotation, disposed distanced along the axis of rotation with respect to the transfer device and provided with at least a support seating disposed in an angular position substantially mating with that of said housing seating of the gripping and holding element in order to support each bar during its transfer, said axis of rotation being located, during use, substantially parallel to the longitudinal development of said bars.

2. The apparatus as in claim 1, further comprising a rotation shaft selectively rotatable around said axis of rotation and on which said transfer disc and said support member are installed.

3. The apparatus as in claim 2, further comprising a plurality of support members installed on said rotation shaft and disposed distanced along the longitudinal extension of the latter.

4. The apparatus as in claim 3, wherein said transfer device is installed in an intermediate position on the length of said rotation shaft and said support members are installed laterally to said transfer device.

5. The apparatus as in claim 1, wherein said transfer device comprises a plurality of gripping and holding elements angularly distanced with respect to said axis of rotation, and wherein said support member is provided with a plurality of support seatings of an equal number and disposed according to an angular configuration substantially mating with that of said housing seatings.

6. The apparatus as in claim 1, wherein said at least one gripping and holding element comprises a magnetic element suitable to hold said bar made of metal material by a magnetic action, inside said housing seating, also during its rotation around the axis of rotation.

7. The apparatus as in claim 1, further comprising a containing body associated on the periphery of said transfer disc in order to surround said transfer disc at least for part of the angular sector comprised between said feed device and said delivery zone and to close, at least for said angular sector, said housing seating.

8. The apparatus as in claim 1, further comprising a selector device associated to said transfer device and configured to ensure that each gripping and holding element transfers a predefined number of said bars toward said delivery zone.

9. The apparatus as in claim 1, wherein said transfer device comprises at least an expulsion device configured to expel said at least one bar from said gripping and holding element and to deliver it toward said delivery zone.

10. The apparatus as in claim 1, further comprising a movement member configured to transfer said at least one bar from said delivery zone toward an operating machine located downstream.

11. A method to feed bars that provides to feed a plurality of bars to a feed device, to deliver said bars to a transfer device, and to transfer said bars toward a delivery zone by means of said transfer device, wherein said transfer of the bars is carried out by putting into rotation, around an axis of rotation located during use substantially parallel to the longitudinal development of said bars, at least one gripping and holding element of said transfer device, said gripping and holding element being provided with a housing seating in which at least one of said bars is inserted and held during the rotation, and wherein during the transfer of said bar at least one support member, with a substantially discoidal shape, rotates around said axis of rotation and supports said bar in its support seating disposed in an angular position substantially mating with that of said housing seating and wherein the delivery zone has at least a support element configured to receive at least one of said bars and a positioning element suitable to hold at least one of said bars, said positioning element comprising a magnet for holding at least one of said bar.

* * * * *